United States Patent [19]
Kanada

[11] Patent Number: 5,957,193
[45] Date of Patent: Sep. 28, 1999

[54] HEAT ACCUMULATOR WITH AGITATING FUNCTION

[75] Inventor: Kenso Kanada, Chiryu, Japan

[73] Assignee: Nippondenso Co., Ltd., Kariya, Japan

[21] Appl. No.: 08/645,842

[22] Filed: May 14, 1996

[30]     Foreign Application Priority Data

May 16, 1995  [JP]  Japan .................................. 7-117405
Feb. 23, 1996 [JP]  Japan .................................. 8-036833

[51] Int. Cl.⁶ .................................................. F28D 17/00
[52] U.S. Cl. .................................. 165/10; 252/70; 165/41
[58] Field of Search ......................... 165/10, 41; 252/70

[56]             References Cited

U.S. PATENT DOCUMENTS

| | | | |
|---|---|---|---|
| 4,117,882 | 10/1978 | Shurcliff | 165/10 X |
| 4,154,292 | 5/1979 | Herrick | 165/10 X |
| 4,574,051 | 3/1986 | Matthews et al. | 252/70 |
| 4,922,998 | 5/1990 | Carr | 165/10 |
| 5,090,474 | 2/1992 | Schatz | 165/10 |
| 5,168,724 | 12/1992 | Gilbertson et al. | 165/10 X |
| 5,222,298 | 6/1993 | Schatz | 165/10 X |
| 5,239,839 | 8/1993 | James | 165/10 X |
| 5,277,038 | 1/1994 | Carr | 165/10 X |
| 5,449,035 | 9/1995 | Strähle et al. | 165/10 |
| 5,605,190 | 2/1997 | Strähle et al. | 165/10 |

FOREIGN PATENT DOCUMENTS

| | | | |
|---|---|---|---|
| 0601379 | 6/1994 | European Pat. Off. | 165/10 |
| 4100193 | 7/1992 | Germany | 165/10 |
| 4106586 | 9/1992 | Germany . | |
| 4244465 | 9/1993 | Germany . | |
| 56-052190 | 9/1954 | Japan . | |
| 0013054 | 1/1979 | Japan | 165/10 |
| 55-006127 | 1/1980 | Japan . | |
| 55-043329 | 3/1980 | Japan . | |
| 57-164285 | 10/1982 | Japan . | |
| 0120085 | 7/1983 | Japan | 165/10 |
| 59-053578 | 3/1984 | Japan . | |
| 59-134494 | 8/1984 | Japan . | |
| 60-191194 | 9/1985 | Japan . | |
| 0238396 | 10/1988 | Japan | 165/10 |
| 3274389 | 12/1991 | Japan | 165/10 |
| 4124592 | 4/1992 | Japan | 165/10 |
| 5-080817 | 11/1993 | Japan . | |
| 6-257973 | 9/1994 | Japan . | |

OTHER PUBLICATIONS

SCHATZ: "Cold Start Improvement by use of Latent Heat Stores", SAE Paper, No. 921605 Aug. 1992.

*Primary Examiner*—Christopher Atkinson
*Attorney, Agent, or Firm*—Pillsbury Madison & Sutro LLP

[57]             ABSTRACT

A phase separation of a salt hydrate as a heat accumulating medium is prevented, thereby maintaining a heat accumulating density of a heat accumulator for a long period of time. A heat accumulating pipe contains $Ba(OH)_2 \cdot 8H_2O$ as a heat accumulating medium which is not subjected to supercooling and a sphere movable in the heat accumulating pipe. A heat insulating vessel having a cooling water inlet pipe and a cooling water outlet pipe is filled with the heat accumulating pipes. By vibrating a heat accumulator having an agitating function which includes the heat accumulating pipes and the heat insulating vessel, the sphere moves in the heat accumulating pipe to agitate the heat accumulating medium, so that a distribution of water becomes uniform and a phase separation is prevented.

22 Claims, 13 Drawing Sheets

HEAT ACCUMULATOR WITH AGITATING FUNCTION

CROSS-REFERENCE TO RELATED APPLICATIONS

The present application is related to and claims priority from Japanese Patent Application Nos. Hei. 7-117405 and 8-36833, incorporated herein by reference.

BACKGROUND OF THE INVENTION

1. Field of the Invention

The present invention relates to a heat accumulator, using latent heat accompanying melting and solidification of a salt hydrate, which is effectively used for a quick-acting heater for an automobile, a quick-acting defroster, a quick-acting heating seat, an engine oil heating device, a hot water supplying device used in a house, or the like.

2. Description of the Related Art

A heat accumulator using latent heat in which heat absorbing and discharging actions accompanying a phase change such as melting, solidification, and the like of a salt hydrate are used is proposed in DE-A1-4244465.

In the technique, $Ba(OH)_2 \cdot 8H_2O$ which is a salt hydrate is used as a heat accumulating medium causing no supercooling. $Ba(OH)_2 \cdot 8H_2O$ absorbs latent heat from the outside in a solid state and liquefies when the melting point is reached. When it solidifies from the liquid state, the absorbed latent heat, for example, 70 cal/g, is discharged to the outside.

By using such a heat accumulating medium, a large amount of the latent heat is obtained and if the latent heat absorbed from the outside is stored into a heat accumulating medium and the heat is discharged when it is needed, it can be effectively used for a quick-acting heater for an automobile, a quick-acting defroster, a quick-acting heating seat, an engine oil heating device, a hot water supplying device used in a house, and the like.

When a distribution of water formed at the time of the melting is not uniform, a phase separation where an unmelted refractory crystal of a high density is deposited at a temperature equal to or larger than a melting point occurs. Since the heat of melting cannot be absorbed by an amount corresponding to the deposited crystal, a heat accumulation density of the heat accumulator is reduced. In order to prevent the phase separation by making the distribution of water forming at the time of the melting uniform, for example, the heat accumulating medium may be mixed with hydrophilic polysaccharide or the like such as xanthin gum as a thickener (see, e.g., Japanese Patent Laid-Open Publication No. 59-53578).

In the heat accumulator such that the heat accumulating medium comprising a salt hydrate is housed in the heat accumulating vessel, however, even if a thickener is added, the distribution of water forming at the time of the melting varies while the heat accumulating medium repeats the melting and the solidification, and the unmelted refractory crystal having a high density is deposited even at a temperature equal to or larger than the melting point. Further, when such a crystal exists, the crystal becomes a core and the unmelted refractory crystal grows while the melting and the solidification are repeated. Since the latent heat cannot be absorbed by an amount corresponding to the crystal, the heat accumulating density of the heat accumulator is reduced.

Since the sensible heat of the thickener is smaller than the latent heat of the heat accumulating medium, when the thickener is added, the heat accumulating density of the heat accumulator is reduced by an amount corresponding to the thickener.

SUMMARY OF THE INVENTION

In view of the foregoing problems, an object of the present invention is to provide a heat accumulator where a distribution of water forming when the heat accumulating medium is melted is made uniform without adding a thickener and unmelted refractory crystals of a high density are prevented from being deposited at a temperature equal to or larger than a melting point even if melting and solidification are repeated, thereby enabling a heat accumulation density of the heat accumulator to be maintained for a long period of time.

The above object is achieved in a first preferred embodiment of the present invention by providing a heat accumulating medium which has a phase that reversibly changes between a liquid phase and a solid phase accompanying absorption and discharge of latent heat, and an agitator agitating the accumulating material. The heat accumulating vessel is disposed in a heat insulating vessel. The heat insulating means further has therein a heat transfer medium.

When the heat transfer medium at a temperature equal to or larger than the melting point of the heat accumulating medium is circulated in the heat insulating vessel through an inlet and an outlet, the heat accumulating medium absorbs latent heat from the heat transfer medium and liquefies. Since outgoing and incoming heat is shielded by the heat insulating vessel, the latent heat is stored in the heat accumulating medium. When the heat transfer medium at a temperature less than the melting point of the heat accumulating medium is circulated in the heat insulating vessel through the inlet and the outlet, the stored latent heat is discharged to the heat transfer medium and the heat accumulating medium solidifies.

Since the heat accumulating medium can be agitated by the agitator in the step in which the heat accumulating medium absorbs the latent heat and liquefies, a distribution of water formed when the heat accumulating medium is melted becomes uniform, and an unmelted refractory crystal of a high density is prevented from forming at a temperature equal to or larger than the melting point. Further, growth of the unmelted refractory crystal due to repetition of the melting and solidification can be retarded. Since all of the latent heat including an amount corresponding to the crystal can be absorbed, the heat accumulating density of the heat accumulator can be consequently maintained for a long period of time without adding a thickener.

Preferably, the device includes a sphere movable in the heat accumulating vessel as the agitator, where the sphere is allowed to move in the heat accumulating vessel to agitate the heat accumulating medium.

The sphere can be moved freely in the heat accumulating vessel by vibration of the running automobile and the like, so that the heat accumulating medium in the heat accumulating vessel can be agitated without using a dedicated drive, for example, a motor or the like. Costs necessary for the dedicated drive can be consequently eliminated and the construction is also simplified.

Further, it is possible that the heat accumulating vessel is vibrated or rotated by the drive as agitator disposed outside of the heat accumulating vessel. Since a stable agitating operation is executed by using the driving means, the heat accumulating medium in the heat accumulating vessel can be agitated more reliably.

It is also possible that the heat insulating vessel has therein a tubular member having one end receiving the heat transfer medium through the inlet, the tubular member has holes in its wall, and the heat transfer medium flows from the tubular member into the heat insulating vessel. Therefore, the heat transfer medium flowing from the holes is circulated in the heat insulating vessel, thereby exchanging heat with the heat accumulating medium in the heat accumulating vessel.

Moreover, the heat insulating vessel may have a single opening, and since the inlet and the outlet are connected to the opening, heat insulating performance of the heat insulating vessel can be enhanced.

The device may further include a hot water supplying source for supplying hot water serving as a heat transfer medium, and a heat radiator which makes the hot water supplied from the heat accumulator and the hot water supplying source exchange heat with air to heat a contained volume. The hot water is circulated from the hot water supplying source to the heat exchanger for heating via the heat insulating vessel by a first circuit. The hot water is circulated from the heat insulating vessel to the heat exchanger for heating by a second circuit.

When the hot water equal to or larger than the melting point of the heat accumulating medium is circulated from the hot water supplying source to the heat insulating vessel by the first circuit, the heat accumulating medium liquefies from the solid by absorbing the latent heat from the hot water and, since the outgoing and incoming of the heat is shielded by the heat insulating vessel, the latent heat is stored in the heat accumulating medium.

When the hot water at a temperature less than the melting point of the heat accumulating medium is circulated from the inlet, the heat radiator, the heat insulating vessel, and to the outlet means by the second circuit, the latent heat stored is discharged to the hot water, so that the heat accumulating medium solidifies from the liquid and the hot water is heated. The heated hot water is heat-exchanged with air by the heat radiator, thereby enabling the passenger room to be heated.

The heat transfer medium may be engine cooling water for an automotive engine and the heat radiator may be a heater core for heating the passenger compartment of a vehicle.

When the engine cooling water at a temperature less than the melting point of the heat accumulating medium is circulated from the heat insulating vessel to the heater core for heating the cabin through the inlet and the outlet by the second circuit, since the latent heat stored is discharged to the engine cooling water, the heat accumulating medium solidifies, thereby heating the engine cooling water. By making the heated engine cooling water exchange heat with the air by the heater core for heating the passenger compartment, the passenger room can be quickly heated even just after the start of the engine on the vehicle in which engine cooling water is not yet warmed.

Further, when the engine cooling water at a temperature less than the melting point of the heat accumulating medium is circulated from the engine on a vehicle to the heater core for heating the passenger room via the heat insulating vessel through the inlet and the outlet by the first circuit, the stored latent heat is discharged to the engine cooling water, so that the heat accumulating medium solidifies and the engine cooling water is heated. Warming up time just after the start of the quick-acting heater for the passenger room and the engine on the vehicle can be reduced by the heated engine cooling water. Purification of exhaust gas and an improvement in fuel consumption can be expected by the shortening of the warming up time of the engine on the vehicle.

Other objects and features of the invention will appear in the course of the description thereof, which follows.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF THE PRESENTLY PREFERRED EXEMPLARY EMBODIMENTS

Embodiments of the present invention will now be described hereinbelow with reference to the drawings.

FIGS. 1 to 6 show a first embodiment of the invention in which the invention is implemented in a quick-acting heater for a vehicle.

Figure 4:
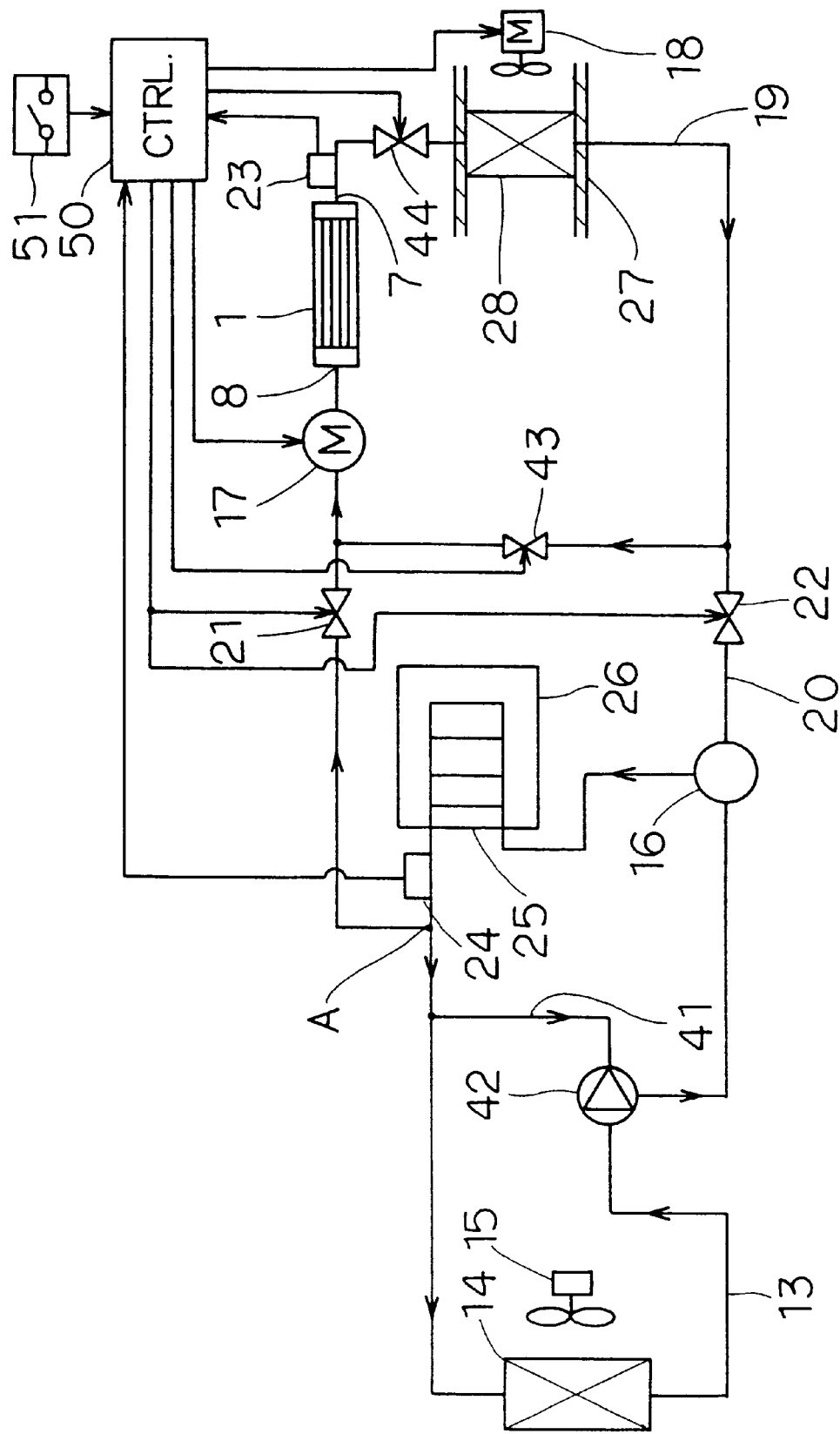
FIG. 4 is a system diagram of an engine coolant circuit according to the first embodiment.

Shown in FIG. 4 are a heat accumulator 1 having an agitating function, which will be described below, a water cooling type engine 25 for driving an automobile, a water jacket 26 for the engine 25, a radiator 14 for cooling engine cooling water, a fan 15 for forcedly sending air to the radiator 14, a water pump 16 driven by the engine, a bypass circuit 41 disposed in parallel with the radiator 14, and a thermostat 42 for controlling a flow of the cooling water to the radiator 14 and the bypass circuit 41.

Reference numeral 28 denotes a heater core, for warming air by heat-exchanging heated cooling water with air, which is housed in a duct 27 of an air conditioning system. Reference numeral 17 indicates an electric-powered water pump for supplying the engine cooling water to the heat accumulator 1, and reference numeral 18 denotes a fan for sending air from the air conditioning system.

Reference numeral 20 denotes a first circuit by which the engine cooling water is circulated from the engine 25 to the heater core 28 via the heat accumulator 1 with an agitating function. Reference numeral 19 indicates a second circuit by which the engine cooling water is circulated from the heat accumulator 1 with an agitating function to the heater core 28. Reference numeral 13 denotes a third circuit by which the engine cooling water is circulated from the engine 25 to the radiator 14.

Reference numeral 50 denotes a control circuit for controlling a quick-acting heater for an automobile according to the embodiment, which controls water temperature sensors 23 and 24, electromagnetic switching valves 21, 22, 43, and 44, the water pump 17 and fan 18. When the driver turns on a quick-acting heater switch 51 of an operation panel of an air-conditioner on vehicle, the control circuit 50 starts operating.

Figure 1:
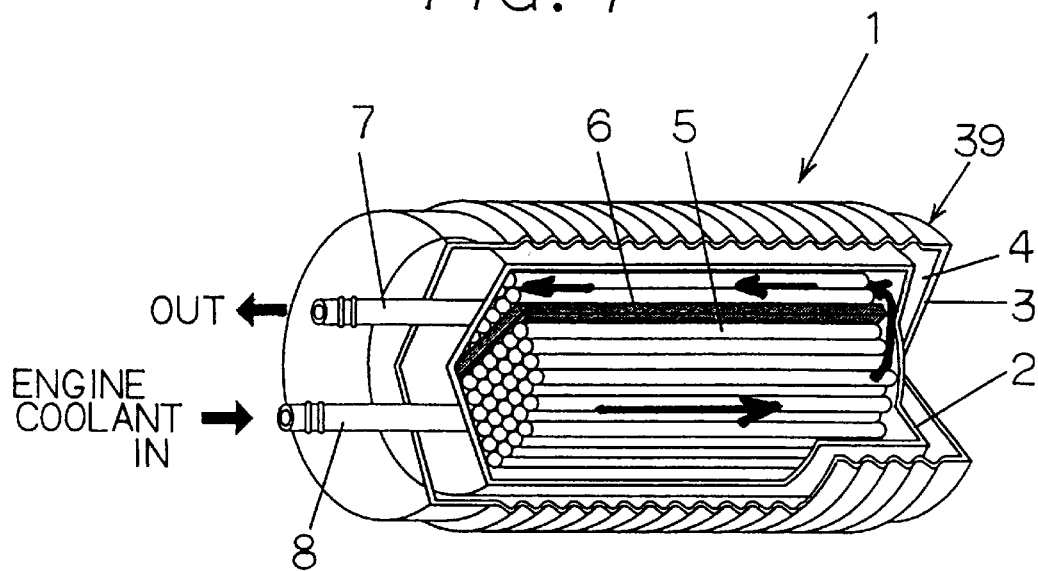
FIG. 1 is a partial cross-sectional diagram illustrating a heat accumulator according to a first embodiment of the present invention.
Figure 2:
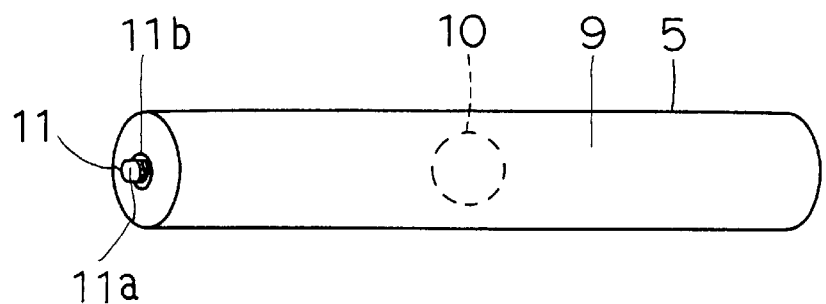
FIG. 2 is a perspective view of an agitator according to the first embodiment.
Figure 3:
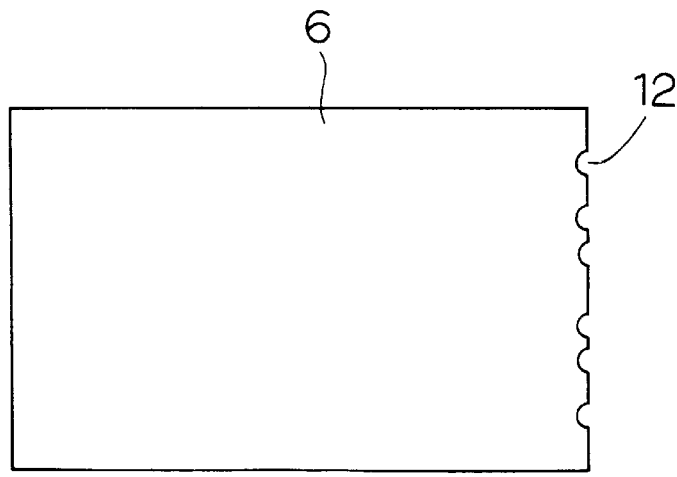
FIG. 3 is a front view of a cooling water separator according to the first embodiment.

The construction of the heat accumulator 1 as shown in FIGS. 1 to 3 will now be described.

A cooling water separator 6 made of a corrosion resisting metal material is disposed in a cylindrical inner vessel 2 made of a corrosion resisting metal material, for example, stainless steel, to partition the inner vessel 2 into two sections. In this embodiment, the inner vessel 2 has an inner diameter of 100 mm and an inner capacity of 0.82 liter. The thickness of the cooling water separator 6 is made thin, e.g., approximately 1 mm, to be compactly housed while remaining tough. Holes 12 are provided on one end of the cooling water separator 6 and are positioned at the bottom of the inner vessel 2. Heat accumulating pipes 5 each having a height which is the same as the inner height of the inner vessel 2 fill the inner vessel 2, thereby efficiently housing and fixing the heat accumulating pipes 5 so that they do not move inside the inner vessel 2. Since the cross section of each of the pipes 5 is circular, a path which will be described below through which the engine cooling water passes is formed between adjacent pipes 5.

The heat accumulating pipes 5 are made of a corrosion resisting metal material having an excellent heat conductivity which can be easily machined—for example, brass. The walls of the pipes 5 are thin and the diameter of the pipes 5 are small to have excellent heat conductivity while remaining tough. In this embodiment, the diameter of the pipes is 14 mm and the thickness of the pipe walls is 0.5 mm. One end of the pipe 5 is completely sealed and the other end has a screw hole 11b. A sphere 10 made of a corrosion resisting metal material is put in each pipe 5 through the screw hole 11b, the pipe 5 is filled with a melted heat accumulating medium 9, and the screw hole 11b is closed by a screw cap 11 made of, e.g., brass.

Reference numeral 11a denotes a spanner receiving section where the screw cap 11 is fixed. As a heat accumulating medium 9, a salt hydrate which has large latent heat and which is completely melted at a temperature of the engine cooling water in a stationary driving mode, for example, 90–100° C. and is completely solidified at a temperature of the engine cooling water required for a temperature of a hot air for heating the passenger room of the car, for example, 40–60° C. is used. In the embodiment, $Ba(OH)_2 \cdot 8H_2O$ having a melting point of 78° C. and latent heat of 70 cal/g is used. A material which is subjected to supercooling so that a phenomenon of a phase change does not occur when it is cooled from the melted state to a temperature below the temperature of the phase change and is not changed if an external impact is given is not used as a heat accumulator 9.

The sphere 10 can move freely in the heat accumulating pipe 5. The size of the sphere 10 is set to a size sufficient to agitate the heat accumulating medium 9. In this embodiment, the diameter is preferably 7 mm, which is half of the inner diameter of the heat accumulating pipe 5. The inner vessel 2 having a capacity of 0.82 liters houses the heat accumulating medium 9 having a capacity of 0.46 liters, the accumulating pipes 5 each having a capacity of 0.06 liters, and about 0.3 liters of engine cooling water.

The cylindrical outer vessel 3 made of a corrosion resisting metal material has the inner vessel 2 disposed therein. A vacuum insulation layer 4 for insulating the heat exchange with the outside is interposed between the outer vessel 3 and the inner vessel 2. The inner vessel 2, outer vessel 3, and vacuum insulation layer 4 constitute a heat insulating vessel 39 for shielding the heat exchange with the outside. An engine cooling water inlet pipe 8 and an engine cooling water outlet pipe 7 each made of a corrosion resisting metal material are hermetically connected to one end of the inner vessel 2 and the outer vessel 3.

The heat accumulator 1 is installed in an engine compartment (not shown) of an automobile in a manner such that the heat accumulating pipes 5 are horizontal with respect to the ground, the engine cooling water inlet pipe 8 is positioned in the lower part of the compartment and the engine cooling water outlet pipe 7 is position in the upper part of the compartment. The engine cooling water flows from the lower part towards the upper part and is allowed to make a U-turn in the heat insulating vessel 39 by the cooling water separator 6. Further, a flow amount of the engine cooling water is adjusted by the size of each of the holes 12 on the cooling water separator 6, thereby improving the heat exchange efficiency.

An operation of the first embodiment will now be described.

First, when the engine 25 is started and the driver turns on the quick-acting heater switch 51 on the operational panel of the air conditioner on a vehicle, the control circuit 50 closes the electromagnetic switching valves 21 and 22 and opens the electromagnetic switching valves 43 and 44 so that engine cooling water having its temperature reduced to approximately the temperature of free air flows to the heat accumulator 1 through the second circuit 19 due to the water pump 17. Since the temperature of the engine cooling water is below the melting point of the heat accumulating medium 9, the heat accumulating medium 9 is cooled and solidifies, and stored latent heat stored is discharged. The engine cooling water in the inner vessel 2 is heated through the wall of the heat accumulating pipes 5 so that the temperature of the engine cooling water can be rapidly increased.

When the warmed engine cooling water is supplied to the heater core 28 by the water pump 17, the water is heat-exchanged with air whose temperature is roughly the temperature of free air sent by the fan 18, and warm air is sent into the cabin. The engine cooling water is circulated in the second circuit 19 and the engine cooling water warmed in the inner vessel 2 is continuously supplied to the heater core 28. Since the warm air can be instantaneously sent into the cabin even if the engine 25 is not sufficiently warmed, a function such as a quick-acting heater for an automobile can be implemented.

When such a quick-acting heater operates, the temperature of the engine 25 rises and the temperature of the engine cooling water supplied from the engine 25 consequently rises. A temperature T2 of the engine cooling water supplied from the engine 25 is sensed by the water temperature sensor 24, a temperature T1 of the engine cooling water flowing in the heater core 28 is sensed by the water temperature sensor 23, and the detection signals are sent to the control circuit 50. When the control circuit 50 determines that T2>T1, the control circuit 50 opens the electromagnetic switching valves 21, 22, and 44, closes the electromagnetic switching valve 43, and stops the water pump 17. Therefore, a part of the engine cooling water warmed by the engine 25 passes a branch A, the switching valve 21, water pump 17, heat accumulator 1, heater core 28, switching valve 22, first circuit 20, water pump 16 and then to engine 25 as shown by the arrow. The above-described function is a stationary heating operation, and the cooling water from the engine 25 is supplied to the heater core 28.

When the temperature of the engine cooling water is below a set temperature, the thermostat 42 opens the bypass circuit 41 side, thereby allowing the cooling water to flow to the bypass circuit 41 side. When the temperature of the cooling water further rises and becomes larger than or equal to the set temperature, the thermostat 42 opens the radiator 14 side and closes the bypass circuit 41 side. Thus, the engine cooling water warmed by the engine 25 is cooled by the radiator 14 and is circulated to the heat accumulator 1 and the heater core 28.

Figure 6:
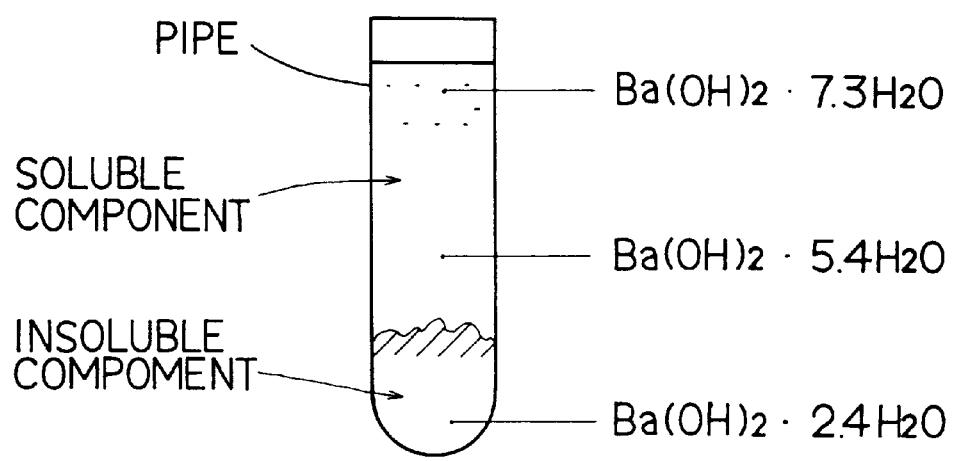
FIG. 6 is a diagram showing a distribution of content of $Ba(OH)_2 \cdot 8H_2O$ separated into phases.

After the engine cooling water flows in the inner vessel 2 from the engine cooling water inlet pipe 8 and passes the cooling water separator 6, the engine cooling water flows out from the engine cooling water outlet pipe 7. When the temperature of the engine cooling water becomes 78° C. or more, the heat accumulating medium 9 absorbs the latent heat and the phase of the heat accumulating medium 9 is changed from solid to liquid. On the other hand, since the sphere 10 is vibrated, rotated, and moved three-dimensionally, i.e., up and down, front and rear, and right and left in association with vibrations due to the running of the car and vibrations when the car turns right or left and stops or starts, the melted heat accumulating medium 9 is agitated and the distribution of water formed at the time of the melting becomes uniform, so that unmelted refractory crystals having a high density are not formed at a temperature equal to or larger than the melting point. When the distribution of water is not uniform, the heat accumulating medium is phase separated into an unmelted component $Ba(OH)_2 \cdot 2.4H_2O$ and dissolved components $Ba(OH)_2 \cdot 5.4H_2O$ and $Ba(OH)_2 \cdot 7.3H_2O$ as shown in FIG. 6.

After stopping the engine, since the outgoing and incoming of the heat is shielded by the heat insulating vessel 39, the latent heat absorbed from the engine cooling water is stored in the heat accumulating medium 9. It is possible to repeat the operation of turning on the quick-acting heater switch 51 after the engine starts to operate the quick-acting heater again.

Figure 5:
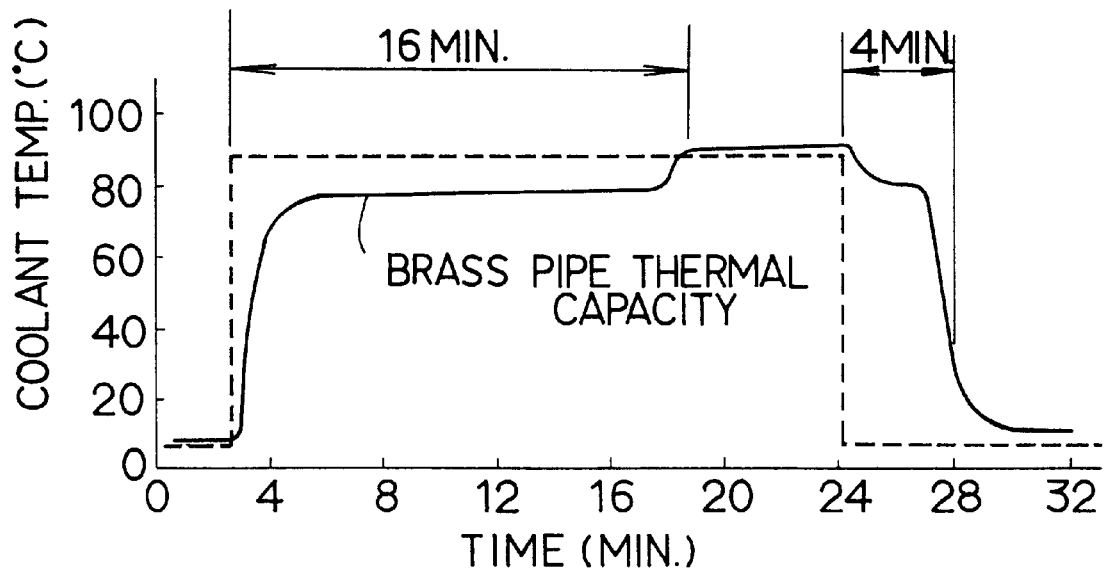
FIG. 5 is a graph showing melting - solidification characteristics of $Ba(OH)_2 \cdot 8H_2O$ filled in a heat accumulating pipe made of brass.

Experimental results of heat absorption and discharge characteristics of the heat accumulator according to this embodiment will be described below with reference to FIG. 5.

In the experiment, one of the heat accumulating pipes 5 is used and $Ba(OH)_2 \cdot 8H_2O$ is used as a heat accumulating medium 9. The graph of FIG. 5 shows a temperature (indicated by a solid line in FIG. 5) of the heat accumulating medium 9 and a water temperature (indicated by a broken line in FIG. 5) of a thermostat when the heat accumulating pipe 5 preliminarily dipped in a thermostat of 10° C. is dipped in a thermostat of 90° C. for approximately 22 minutes and, after that, the heat accumulating pipe 5 is further dipped in a thermostat of 10° C. for approximately 10 minutes.

As will be understood from the graph, when the heat accumulating pipe 5 containing the heat accumulating medium 9 in a complete solidification state is dipped in the thermostat of 90° C., the heat accumulating medium 9 absorbs heat from the hot water, stores the latent heat, and is perfectly melted within approximately sixteen minutes. After that, when the heat accumulating pipe 5 is dipped in the thermostat of 10° C., the heat accumulating medium 9 is completely solidified by discharging the latent heat to the hot water within four minutes.

The characteristics of the quick melting and quick solidification are appropriate for use in a quick-acting heater for an automobile. The present inventor has confirmed that the quick-acting heater for the automobile must discharge heat within about five minutes after the start of the engine and the embodiment particularly satisfies this requirement.

Figure 7:
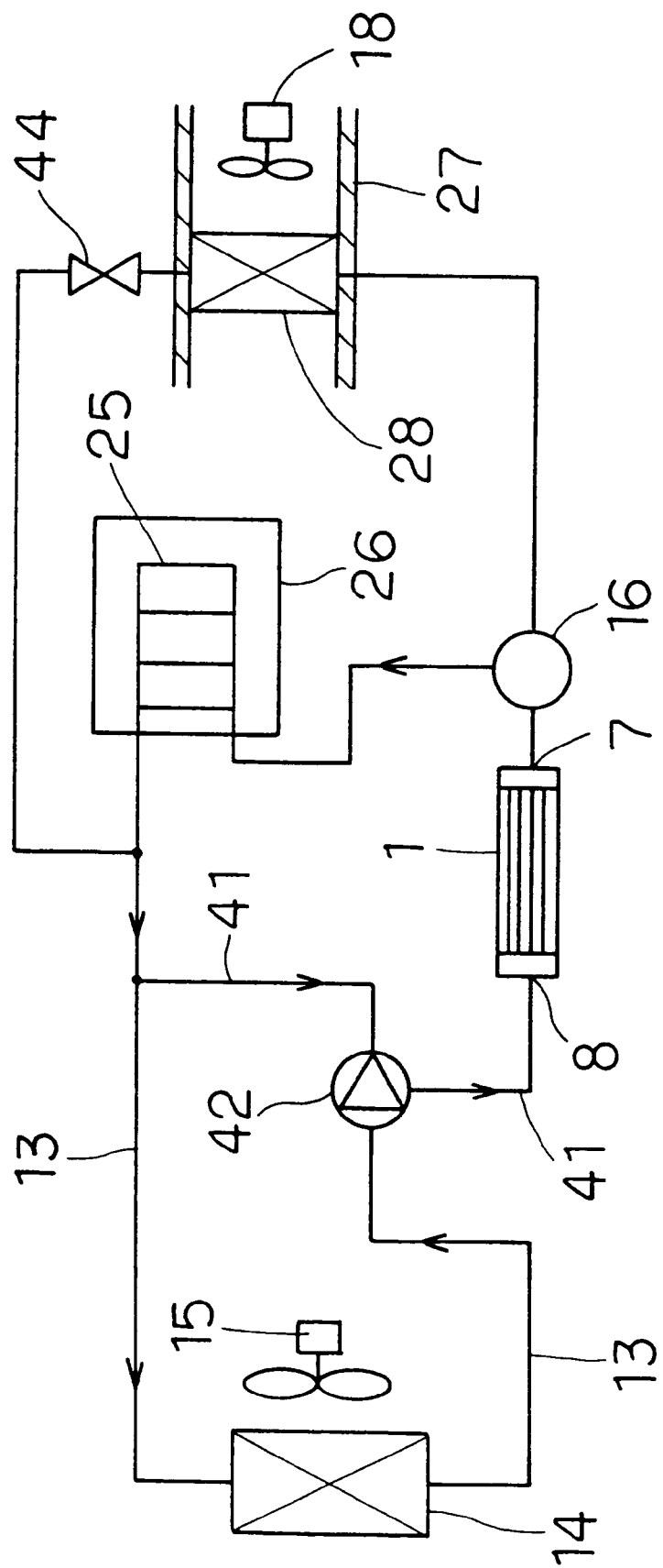
FIG. 7 is a system diagram showing a second embodiment of the present invention.

FIG. 7 shows a second embodiment of the present invention where the heat accumulator 1 as in the first embodiment is disposed in the circuit in which the cooling water flows from the radiator 14 to the engine 25. When the electromagnetic switching valve 44 is closed by the sensor (not shown) and the control circuit after the start of the engine 25, since the heated cooling water is supplied only to the engine 25 by the water pump 16, all of the latent heat accumulated in the heat accumulator 1 can be used for reducing a warming up time of the engine 25. Since the accumulated latent heat is not used for heating, the electromagnetic switching valves 21, 22, 43, the temperature sensors 23 and 24, and the water pump 17 are omitted.

Figure 8:
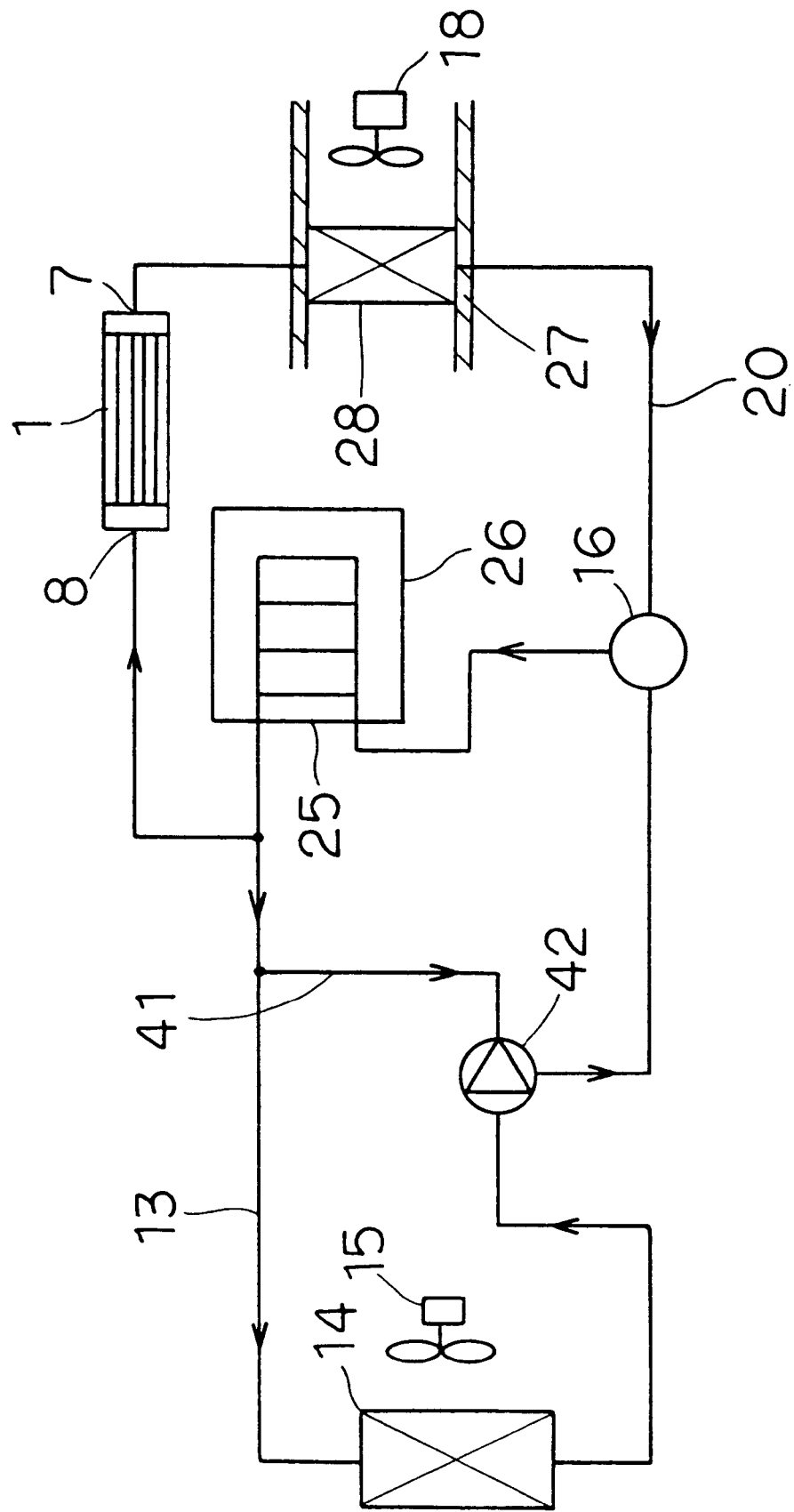
FIG. 8 is a system diagram showing a third embodiment of the present invention.

In a third embodiment of the present invention shown in FIG. 8, since the heated cooling water is supplied to the heater core 28 and is allowed to flow directly into the engine 25 by the heat accumulator 1, the latent heat accumulated in the heat accumulator 1 is preferentially used for heating the cabin, and further can be used for reducing the warming up time. Since the accumulated latent heat is used only for heating, the electromagnetic switching valves 21, 22, 43, and 44, and the temperature sensors 23 and 24, and the water pump 17 in the first embodiment are removed.

Fourth to tenth embodiments shown below relate to modifications of the agitator for agitating the heat accumulating medium 9.

Figure 9:
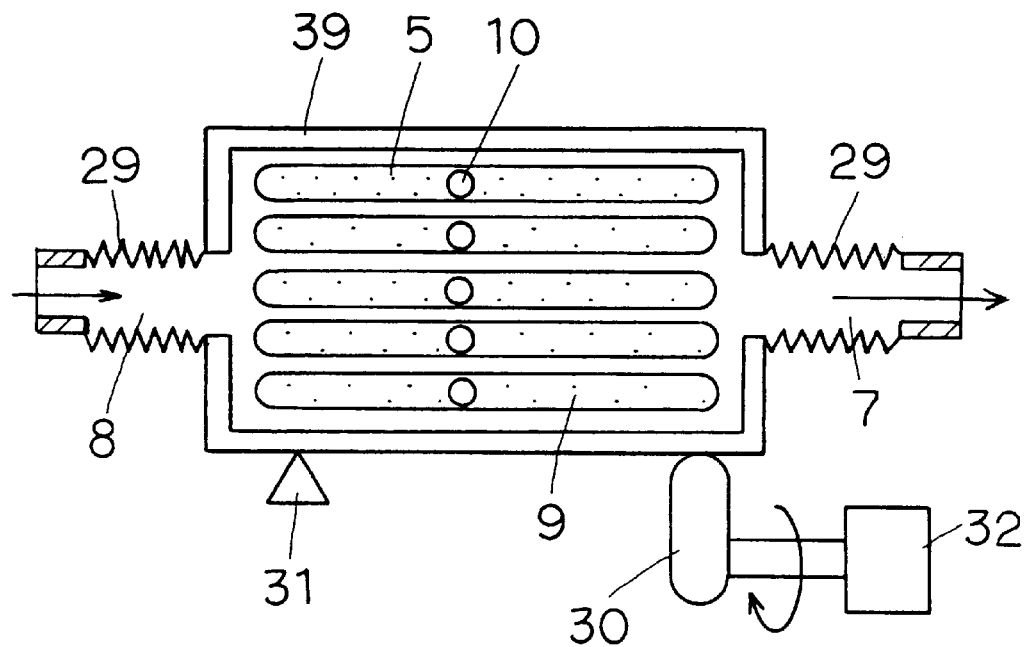
FIG. 9 is a cross-sectional view illustrating a fourth embodiment of the present invention.

In a fourth embodiment of the present invention shown in FIG. 9, a part of each of the engine cooling water inlet pipe 8 and the engine cooling water outlet pipe 7 is an elastic deformable bellows 29. One end of the lower part of the heat insulating vessel 39 is supported by a cam 30 and the other end is supported by a supporting stand 31. The cam 30 is rotated by a motor 32 serving as a drive.

The heat accumulator 1 according to this embodiment has a sensor (not shown) for detecting the temperature of the heat accumulating medium 9. When the sensor detects that the heat accumulating medium 9 is melted, a control circuit (not shown) drives the motor 32. By rotating the cam 30 using the motor 32, one end of the heat insulating vessel 39 is moved up and down and the sphere 10 in the heat accumulating pipe 5 is consequently moved, thereby agitating the heat accumulating medium 9.

Figure 10:
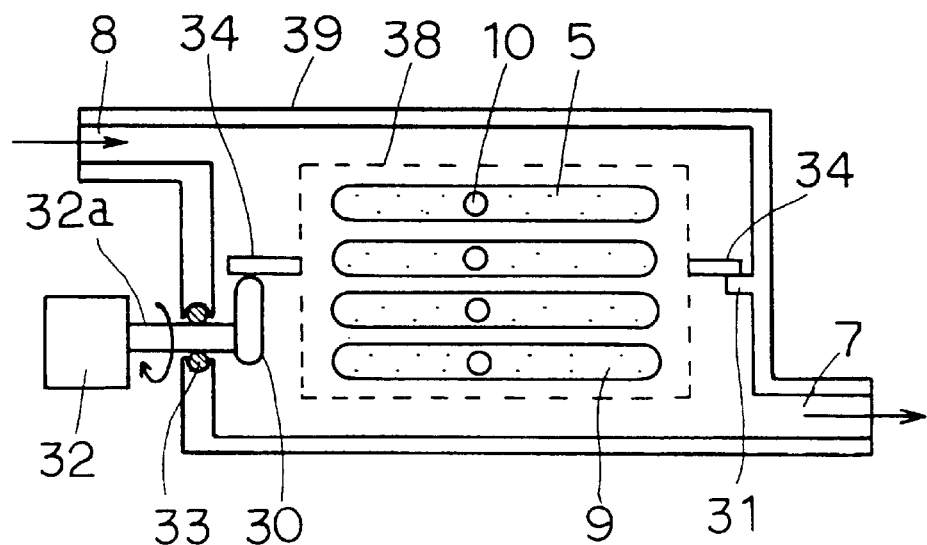
FIG. 10 is a cross-sectional view illustrating a fifth embodiment of the present invention.

In a fifth embodiment of the present invention shown in FIG. 10, reference numeral 38 denotes a heat accumulating pipe rack made of a corrosion resisting metal material in a wire netting state constructed so that the heat transfer medium can freely pass back and forth therethrough. Supporting rods 34 are provided for both ends of the heat accumulating pipe rack 38 and the heat accumulating pipe rack 38 is filled with the heat accumulating pipes 5. The cam 30 which can be rotated by the motor 32 is inserted to a position different from the position of the engine cooling water inlet pipe 8 at one end of the heat insulating vessel 39. The supporting stand 31 is disposed at the other end inside the heat insulating vessel 39.

The heat accumulating pipe rack 38 is supported by the supporting stand 31 and the cam 30 in the heat insulating vessel 39. An engagement portion of a shaft 32*a* of the motor 32 and the heat insulating vessel 39 is sealed by an O ring 33 so that the heat transfer medium does not leak therefrom. One end of the heat accumulating pipe rack 38 is moved in the vertical direction by rotating the cam 30 by the motor 32.

Figure 11:
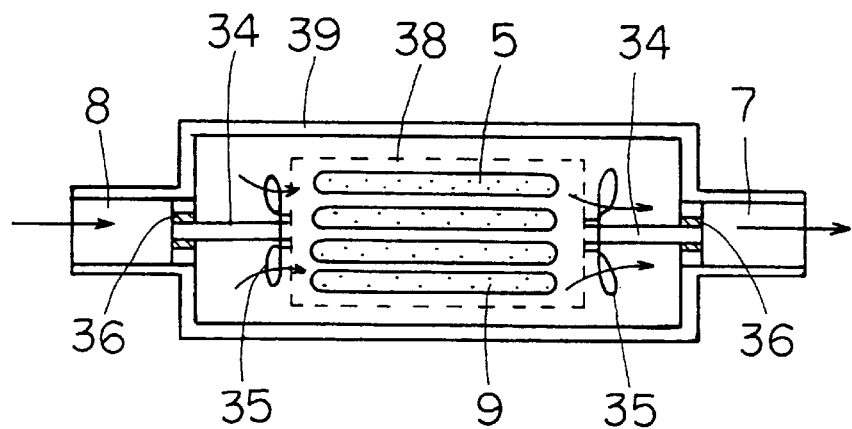
FIG. 11 is a cross-sectional view illustrating a sixth embodiment of the present invention.

In a sixth embodiment of the present invention shown in FIG. 11, the supporting rods 34 are provided for both ends of the heat accumulating pipe rack 38 and moving blades 35 are fixed to the supporting rods 34. Bearings 36 for rotatably supporting the supporting rods 34 are disposed in the engine cooling water inlet pipe 8 and the engine cooling water outlet pipe 7.

The moving blades 35 are rotated by receiving a force of a flow of the engine cooling water and the heat accumulating pipe rack 38 is consequently rotated, thereby agitating the heat accumulating medium 9 in the heat accumulating pipes 5.

Figure 12:
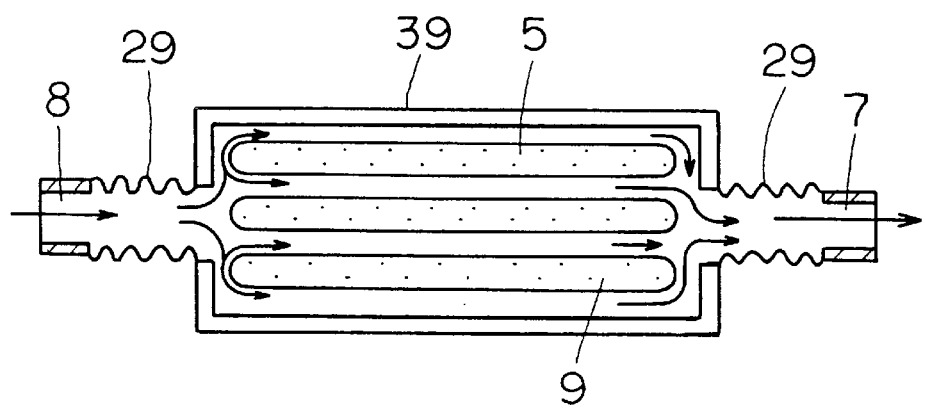
FIG. 12 a cross-sectional view illustrating a seventh embodiment of the present invention.

In a seventh preferred embodiment of the present invention shown in FIG. 12, a part of each of the engine cooling water inlet pipe 8 and the engine cooling water outlet pipe 7 is the bellows 29. The apparatus shown in FIG. 12 is installed in an apparatus having a vibration source such as an automobile, an engine, or the like.

Jolting of the automobile, engine, or the like is amplified by the bellows 29 to jolt the heat insulating vessel 39, thereby agitating the heat accumulating medium 9 in the heat accumulating pipes 5.

Figure 13:
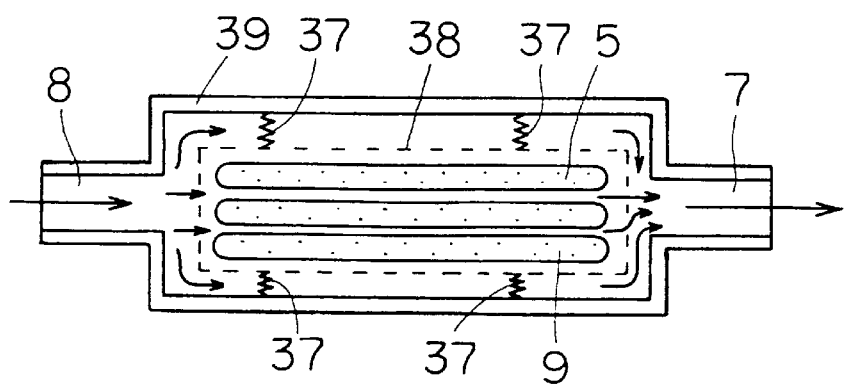
FIG. 13 is a cross-sectional view illustrating an eighth embodiment of the present invention.

In an eighth embodiment of the present invention shown in FIG. 13, by disposing springs 37 inside the heat insulating vessel 39 and outside the heat insulating pipe rack 38, the heat accumulating pipe rack 38 is elastically fixed in the heat insulating vessel 39.

The jolting of the automobile, engine, or the like is amplified by the springs 37, thereby enabling the heat insulating vessel 39 to be jolted.

Figure 14:
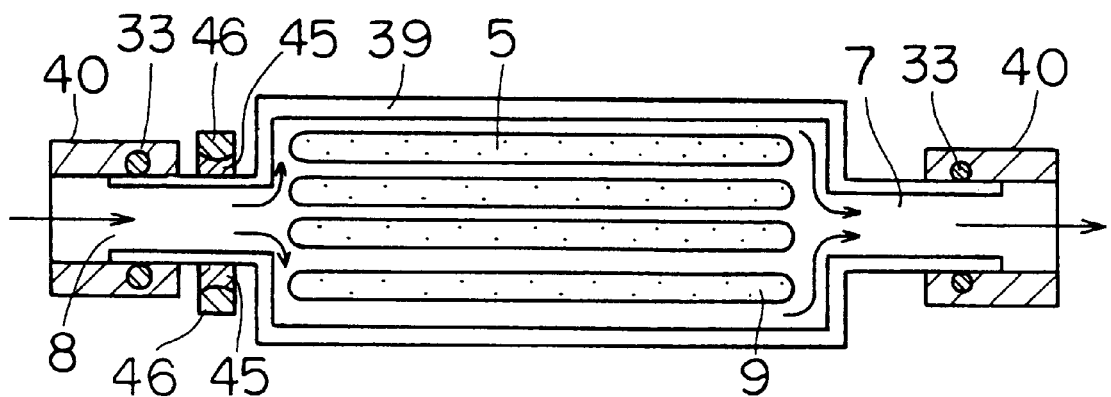
FIG. 14 is a cross-sectional view illustrating a ninth embodiment of the present invention.

In a ninth embodiment of the invention shown in FIG. 14, the engine cooling water inlet pipe 8 is hermetically connected to the center of one end of the heat insulating vessel 39 and the engine cooling water outlet pipe 7 is hermetically connected to the center of the other end. The engine cooling water inlet pipe 8 and the engine cooling water outlet pipe 7 are rotatably supported by fixed pipes 40. The engagement portion is sealed by the O ring 33 so that the engine cooling water does not leak out. Pulleys 45 are fixed outside the engine cooling water inlet pipe 8 and the engine cooling water outlet pipe 7. Each of the pulleys 45 has a belt 46 for applying rotational force.

The heat insulating vessel 39 is rotated by an engine (not shown) through the belt 46 to agitate the heat accumulating medium 9 in the heat accumulating pipes 5.

Figure 15:
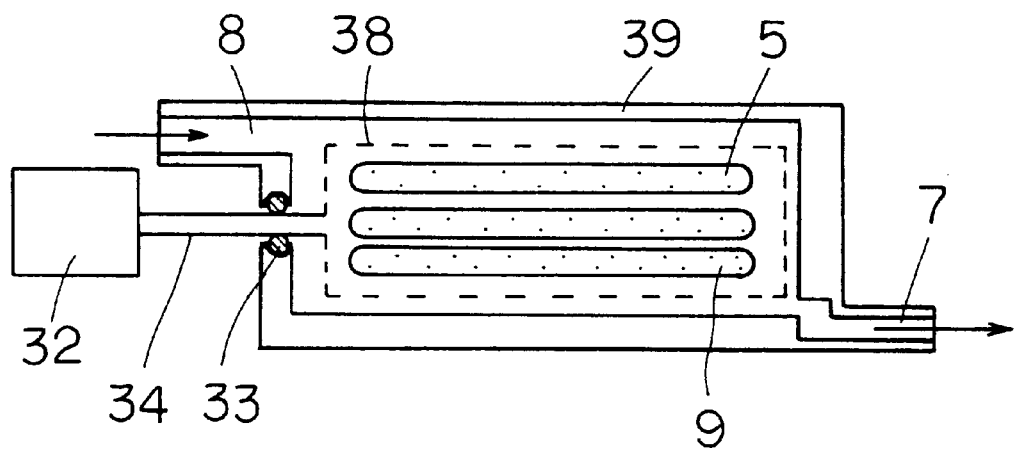
FIG. 15 is a cross-sectional view illustrating a tenth embodiment of the present invention.

In a tenth preferred embodiment of the present invention shown in FIG. 15, the supporting rod 34 is provided at one end of the heat accumulating pipe rack 38 and the heat accumulating pipe rack 38 is rotated by the motor 32 through the supporting rod 34. Further, the heat accumulating pipe rack 38 is inserted from the end of the heat insulating vessel 39 through the supporting rod 34. The engagement portion is sealed by the O ring 33 so that the cooling water does not leak out.

Figure 16:
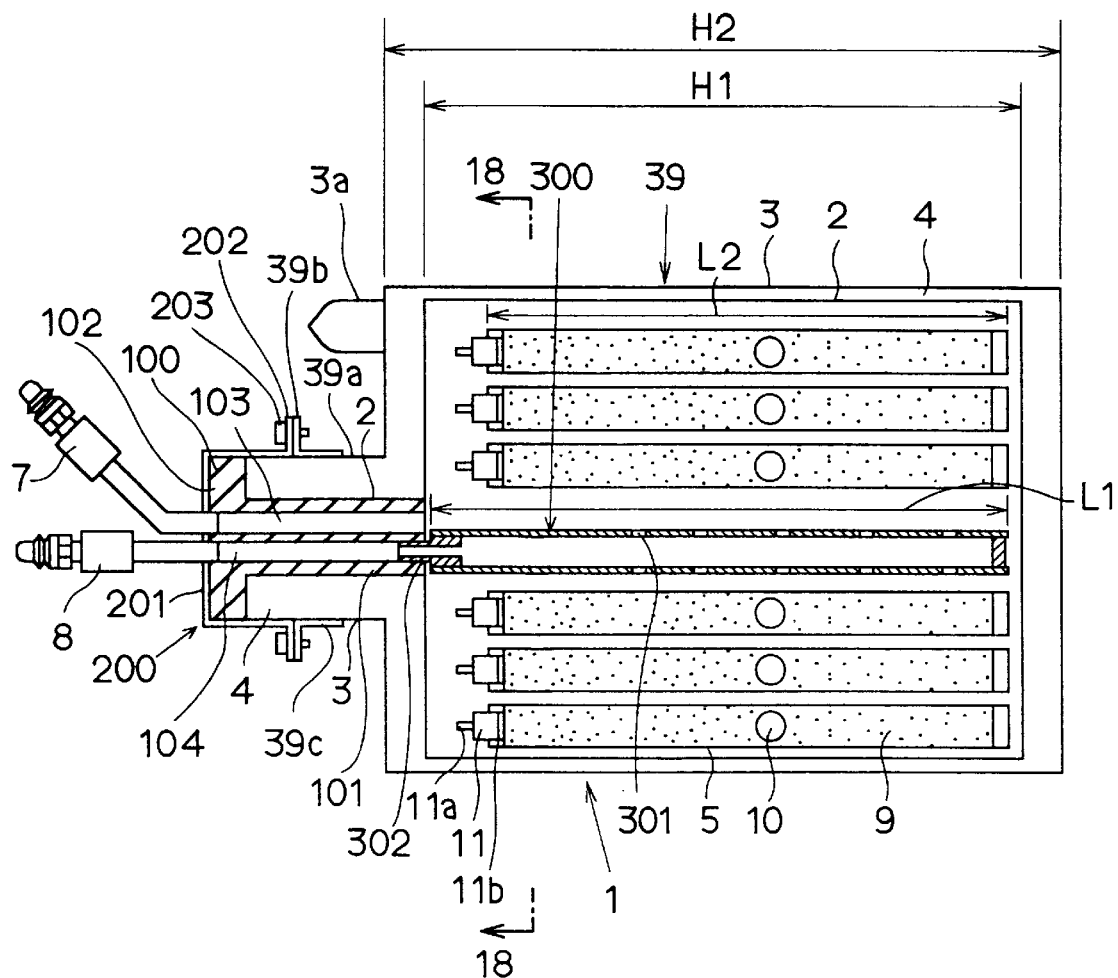
FIG. 16 is a partial cross-sectional view showing an eleventh embodiment of the present invention.

In an eleventh preferred embodiment of the present invention shown in FIG. 16, the cooling water separator 6 in the foregoing first embodiment is removed and a porous pipe 300 is provided instead. Although the engine cooling water outlet pipe 7 and the engine cooling water inlet pipe 8 are provided in different places in the heat insulating vessel 39 in the foregoing first embodiment, only one tubular projection section 39*a* almost vertically projecting in a tubular shape from the left side surface of the heat insulating vessel 39 in FIG. 16 is connected to the heat insulating vessel 39 in the eleventh embodiment. The engine cooling water outlet pipe 7 and the engine cooling water inlet pipe 8 are provided for the tubular projection section 39*a*.

The tubular projection section 39*a* is used for connecting the inside and outside of the heat insulating vessel 39. An aperture of the heat insulating vessel 39 is formed by the tubular projection section 39*a*. The tubular projection section 39*a* is defined by the inner vessel 2, the outer vessel 3, and the vacuum insulation layer 4. Reference numeral 3*a* in FIG. 16 denotes an air bleeding section for bleeding the air in the vacuum insulation layer 4 between the inner vessel 2 and the outer vessel 3.

A sealing cap 100 made of an elastic member having excellent heat resistance and corrosion resistance and poor heat conductivity, for example, silicon gum, is pressed and fixed to the tubular projection section 39*a*. The engine cooling water outlet pipe 7 and the engine cooling water inlet pipe 8 are hermetically connected to the tubular projection section 39*a* by the sealing cap 100.

That is, the sealing cap 100 integrally has a first cylinder section 101 having a diameter slightly larger than the inner diameter of the tubular projection section 39*a* and a second cylinder section 102 having a diameter which is the same as the outer diameter of the tubular projection section 39*a*. Two through holes 103 and 104 extending in an axial direction are formed in the center of the sealing cap 100.

Further, a glass-shaped cover member 200 integrally having the engine cooling water outlet pipe 7 and the engine cooling water inlet pipe 8 disposed therein is provided for the tubular projection section 39*a*. The pipes 7 and 8 are fixed to a bottom section 201 by a welding so that the engine cooling water outlet pipe 7 and the engine cooling water inlet pipe 8 penetrate through the bottom section 201 of the cover member 200. One end of the pipe 7 is engaged with the through hole 103 of the sealing cap 100 and one end of the pipe 8 is engaged with the through hole 104, and the pipes are pressed and fixed by an elasticity of the sealing cap 100.

A sword guard (flat plate) shape section 202 is formed on the side surface on the aperture side of the cover member 200. The cylindrical member 39c having a sword guard shape section 39b is also integrally fixed on the outer periphery of the tubular projection section 39a in correspondence with the sword guard shape section 202. The sword guard shape sections 202 and 39b are fixed by bolts 203, thereby aligning the cover member 200 with the tubular projection section 39a.

The porous pipe 300 is defined by a cylindrical member having one open end and one closed end. A plurality of holes 301 are formed on the wall surface of the porous pipe 300. A mounting port 302 provided for one end of the porous pipe 300 is pressed and fixed to the sealing cap 100 so that the mounting port 302 is engaged with the through hole 104 of the sealing cap 100. The porous pipe 300 has, for example, a length L1 of 150 mm, an inner diameter of 12 mm, and an outer diameter of 14 mm. An outer diameter of the mounting port 302 is equal to 6 mm. Each of the holes 301 of the porous pipe 300 has a diameter of 3 mm. A total of twenty holes 301 are formed therein to provide an array of five holes in the axial direction of the porous pipe 300 and four holes in the circumferential direction thereof.

Figure 17:
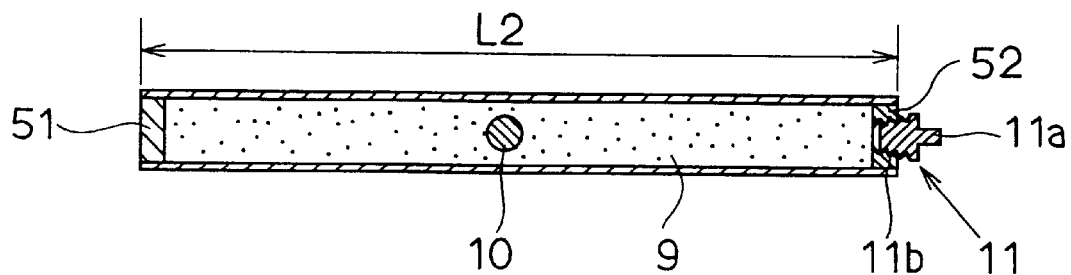
FIG. 17 is a cross-sectional view of a heat accumulating pipe according to the eleventh embodiment.

The heat accumulating pipe 5 according to the embodiment is constructed as shown in FIG. 17 so that covers 51 and 52 made of brass are connected to opposite ends of a hollow cylindrical pipe made of brass by brazing. The heat accumulating pipe 5 has, for example, a length L2 of 140 mm, a wall thickness of 0.2 mm and an outer diameter of 20 mm. A silver solder having excellent corrosive-resistant properties with respect to $Ba(OH)_2 \cdot 8H_2O$ is used for the brazing. A screw hole 11b for a tube of PT⅛ is formed on the cover 52, a sphere 10 having a diameter of 8 mm is disposed therein through the screw hole 11b, and the screw cap 11 is screwed into the screw hole 11b.

Figure 18A:
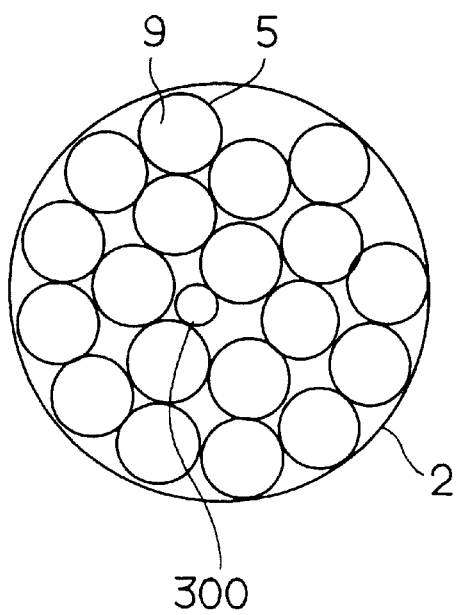
FIG. 18A is a cross-sectional view of a heat insulating vessel in the eleventh embodiment.

In FIG. 16, the heat accumulator 1 has dimensions such that, for example, a width H2 of the outer vessel 3 is equal to 172 and its diameter is equal to 112 mm, and a width H1 of the inner vessel 2 is equal to 150 mm and its diameter is equal to 100 mm. An inner diameter of the tubular projection section 39a is equal to 22 mm. As shown in FIG. 18A, the heat insulating vessel 39 is filled with nineteen accumulating pipes 5.

An outer diameter of each of the engine cooling water outlet/inlet pipes 7 and 8 is equal to 6 mm and a diameter of each of the through holes 103 and 104 of the sealing cap 100 is equal to 5 mm. The sealing cap 100 is made of silicon gum. In this case, an inner diameter of the tubular projection section 39a of the heat insulating vessel 39 is set as small as possible while permitting the heat accumulating pipe 5 to be inserted.

In the heat accumulator with the above construction, when the hot water supplied from the engine 25 (see FIG. 4) side flows through the engine cooling water inlet pipe 8, it flows in the porous pipe 300 through the through hole 104 of the sealing cap 100, and the hot water in the porous pipe 300 gushes out from the holes 301 thereof. The hot water is circulated around the heat accumulating pipes 5 in the heat insulating vessel 39, exchanges heat with the heat accumulating medium 9 in the heat accumulating pipes 5, passes the through hole 103 of the sealing cap 100 and the engine cooling water outlet pipe 7, and exits to the engine 25 side (see FIG. 4).

A method of assembling the heat accumulator according to this embodiment will be described hereinbelow with reference to FIGS. 19 and 20.

Figure 19A:
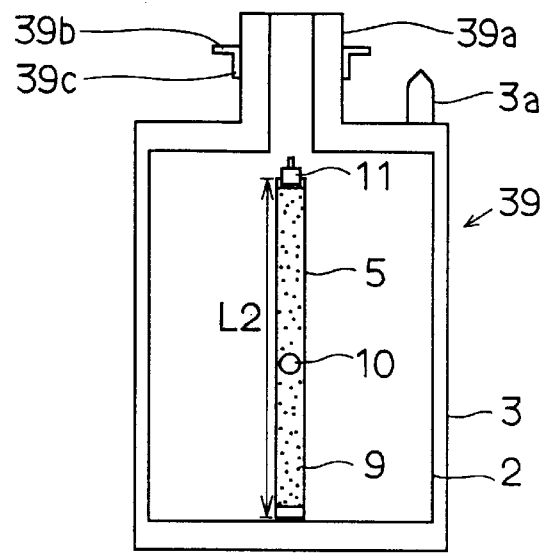
FIGS. 19A to 19C are diagrams showing a method of assembling the heat accumulator according to the eleventh embodiment.

As shown in FIG. 19A, the heat insulating vessel 39 is disposed so that the tubular projection section 39a is in the upper part thereof and the heat accumulating pipe 5 is inserted from the tubular projection section 39a. As shown in FIG. 17, the bottom on the cover 51 side of the heat accumulating pipe 5 is flat and is vertical for the longitudinal direction of the heat accumulating pipe 5. An outer diameter of the heat accumulating pipe 5 is equal to 20 mm so that the heat accumulating pipe 5 stably stands on the flat bottom section of the heat insulating vessel 39.

Figure 19B:
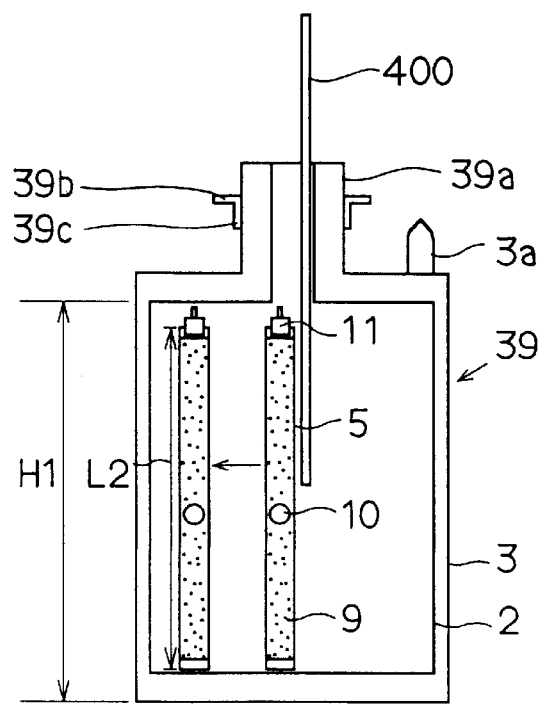
Figure 19C:
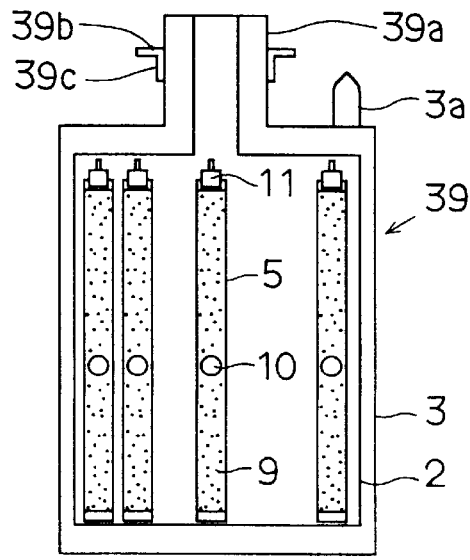
Figure 20A:
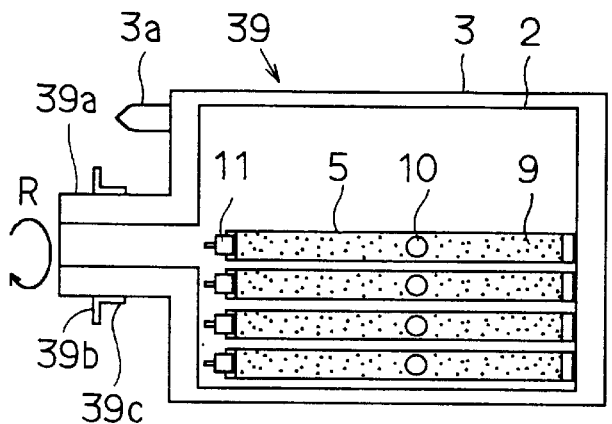
FIGS. 20A–20D are diagrams showing a method of assembling the heat accumulator according to the eleventh embodiment.

As shown in FIG. 19B, the heat accumulating pipe 5 is moved little by little toward the side of the heat insulating vessel 39 by a stick 400. By repeating such an operation, six or seven heat accumulating pipes 5 (there are heat accumulating pipes 5 not shown in the diagram) are inserted into the heat insulating vessel 39 as shown in FIG. 19C. Small gaps exist among the heat accumulating pipes 5 since the pipes 5 are merely moved by the stick 400 in this case. The heat insulating vessel 39 is put down on its side as shown in FIG. 20A and is rotated in the direction of the arrow R in the diagram, thereby making the gap as small as possible and arranging the heat accumulating pipes 5 in a closely-packed fashion.

Figure 20B:
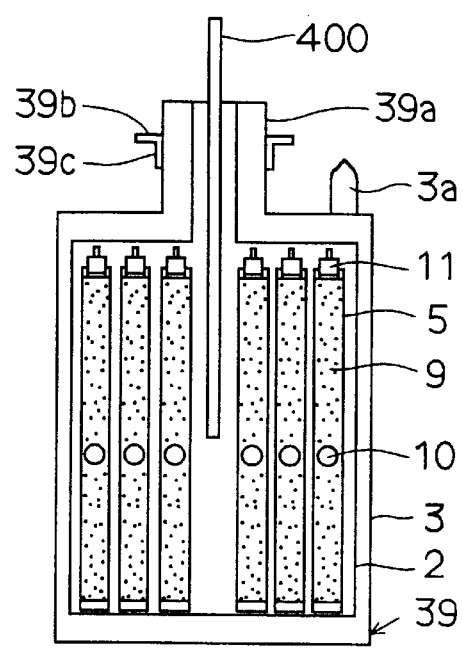

As shown in FIG. 20B, the heat insulating vessel 39 is again disposed so that the tubular projection section 39a is in the upper part thereof, the heat accumulating pipes 5 are inserted into the heat insulating vessel 39 and an empty portion of the heat insulating vessel 39 is filled with the heat accumulating pipes 5 while moving the pipes using the stick 400. The operations shown in FIGS. 20A and 20B are repeated as necessary, thereby filling the heat insulating vessel 39 with the heat accumulating pipes 5 at the highest density possible. The highest possible density filling denotes a state where the heat insulating vessel 39 having therein one porous pipe 300 is filled with as many heat accumulating pipes 5 as possible as shown in FIG. 18A.

Figure 20C:
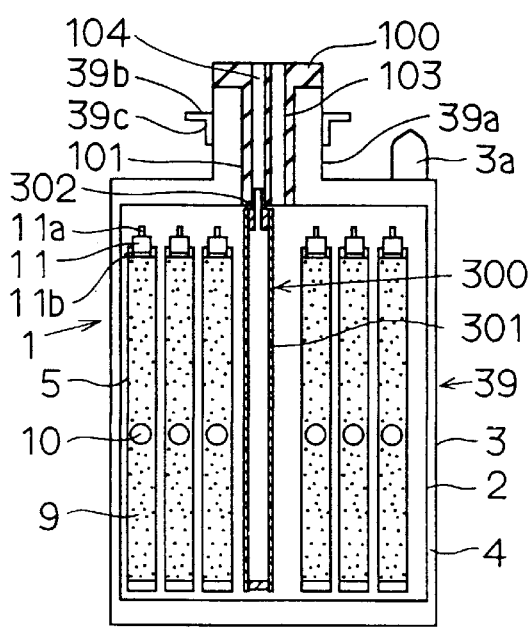
Figure 20D:
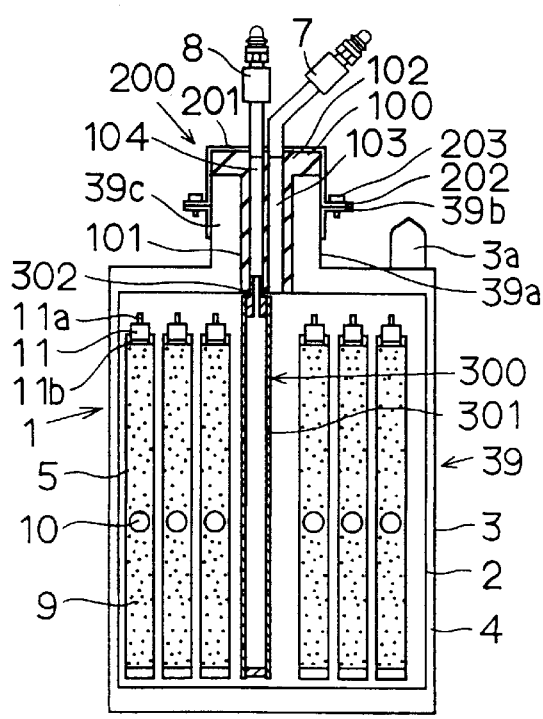

As shown in FIG. 20C, the first cylinder section 101 of the sealing cap 100 where the porous pipe 300 is press-fitted and fixed to the through hole 104 is press-fitted and fixed to the tubular projection section 39a of the heat insulating vessel 39. As shown in FIG. 20D, the cover member 200 integrally having the engine cooling water outlet pipe 7 and the engine cooling water inlet pipe 8 is disposed on the second cylinder section 102 of the sealing cap 100. While pressing and fixing one end of the engine cooling water outlet pipe 7 to the through hole 103 of the sealing cap 100 and one end of the engine cooling water inlet pipe 8 to the through hole 104, the sword guard shaped sections 39b and 202 are fastened and fixed by the bolts 203, thereby assembling the cover member 200 on the tubular projection section 39a of the heat insulating vessel 39.

Experimental results of the solidification—dissolution characteristics of the heat accumulating medium 9 in the heat accumulator 1 according to the embodiment will be described hereinbelow with reference to FIGS. 16 to 21.

Figure 21:
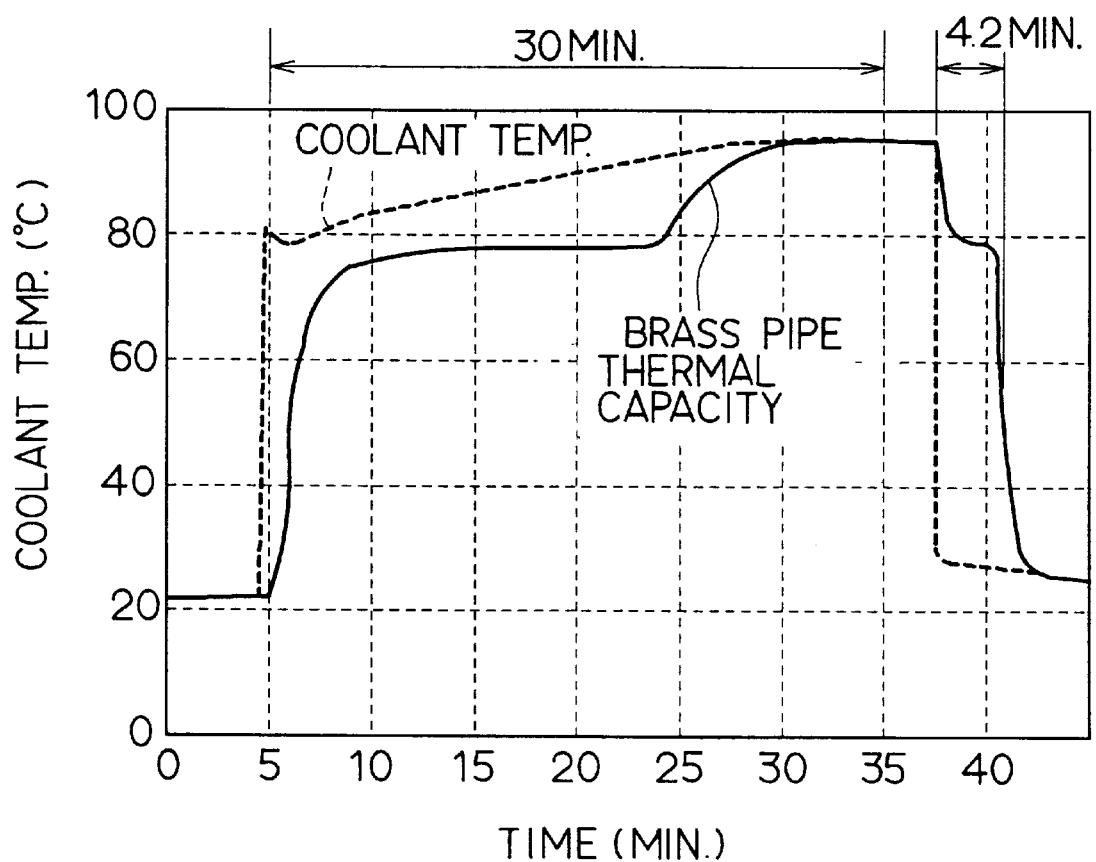
FIG. 21 is a graph showing melting—solidification characteristics of $Ba(OH)_2 \cdot 8H_2O$ in the eleventh embodiment.

The graph of FIG. 21 shows the behavior of the temperature (shown by a solid line in FIG. 21) of the heat accumulating medium 9 and a hot water temperature (shown by a broken line in FIG. 21) in the engine cooling water inlet pipe 8 when hot water at approximately 80 to 95° C. is circulated in the heat accumulator 1 for approximately 33 minutes and, after that, water at about 25° C. is circulated in the heat accumulator 1 for eight minutes.

A thermostat whose temperature can be selectively set is used as a hot water supplying source. A setting temperature of the thermostat is set to 95° C., an inlet and an outlet of the thermostat are connected to the outlet and inlet pipes 7 and 8, respectively, of the heat accumulator 1 with an agitating function, and hot water is circulated in the thermostat and the heat accumulator 1. The hot water temperature in the engine cooling water inlet pipe 8 gradually rises from 80° C. and reaches 95° C. in the graph of FIG. 21. This is because the measurement of the temperature is started from the time when the hot water temperature of the thermostat is equal to approximately 80° C.

When the hot water at 95° C. is cooled to water at 25° C., after disconnecting the inlet and outlet of the thermostat from the outlet and inlet pipes 7 and 8 of the heat accumulator 1, the service water (25° C.) is supplied at a flow velocity of 4.5 l/min from the engine cooling water inlet pipe 8 and the water from the engine cooling water outlet pipe 7 is discharged to the outside.

As will be understood from the graph, by circulating the hot water at 95° C. in the thermostat to the heat accumulator 1 for approximately 30 minutes, the heat accumulating medium 9 absorbs the heat from the hot water, accumulates latent heat, and is completely melted. By supplying water at approximately 25° C. to the heat accumulator 1 in a state where the heat accumulating medium 9 is melted, the heat accumulating medium 9 discharges the latent heat to the water and completely solidifies.

Such rapid melting and rapid solidification characteristics are suitable for a quick-acting heater for an automobile. Especially, since it is confirmed by the present inventor that it is most preferable to discharge the heat within about five minutes after the start of the engine, the above embodiment satisfies the necessity.

Effects of this embodiment will now be described hereinbelow.

Figure 18B:
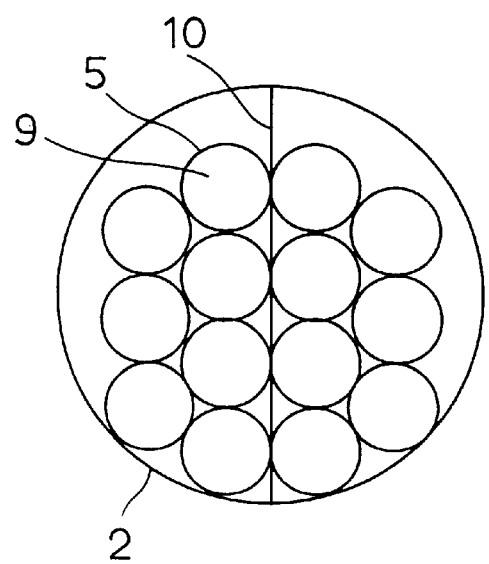
FIG. 18B is a cross-sectional view of a heat insulating vessel in the first embodiment.

In the first embodiment using the cooling water separator 6 as shown in FIG. 18B, for example, when an inner diameter of the heat insulating vessel 39 is 100 mm, an outer diameter of the heat accumulating pipe 5 is 20 mm, and a thickness of the cooling water separator 6 is 1 mm, the heat insulating vessel 39 can be filled with fourteen heat accumulating pipes 5, so that the filling ratio of the heat accumulating medium 9 for the volume inside the heat insulating vessel 39 is equal to 56%.

In the embodiment using the porous pipe 300 of an outer diameter of 14 mm in place of the cooling water separator 6, as shown in FIG. 18A, the heat insulating vessel 39 can be filled with nineteen heat accumulating pipes 5, so that the filling ratio is equal to 77%. Thus, according to the eleventh embodiment, the heat accumulating pipes 5 can be more efficiently enclosed in the heat insulating vessel 39.

In the case where a filling ratio of the heat accumulating medium 9 for a heat accumulator is determined in advance, the number of heat accumulating pipes 5 necessary is decided in accordance with the predetermined filling ratio. According to the embodiment, since the heat accumulating pipes 5 can be housed in the heat insulating vessel 39 more efficiently, the inside volume of the heat insulating vessel 39 for housing the necessary number of heat accumulating pipes 5 can be smaller, so that the heat accumulator can be consequently miniaturized.

When connecting the engine cooling water outlet and inlet pipes 7 and 8 in different positions of the heat insulating vessel 39, two openings (the tubular projection section 39a in the embodiment) for connecting the inside and outside are necessary for the heat insulating vessel 39. Each one of the openings needs a sectional area which is large enough for the accumulating pipe 5 to be smoothly inserted therein.

In the embodiment, only one opening, namely, one tubular projection section 39a is provided and the opening formed by the tubular projection section 39a has a sectional area which is large enough for the heat accumulating pipe 5 to be smoothly inserted. It is generally known that the heat retaining property is better when the number of openings is smaller and the sectional area of the opening is smaller, so that the embodiment can better improve the heat retaining property compared with the first embodiment in which the heat insulating vessel 39 has two openings.

The heat insulating vessel 39 is formed by welding. According to the embodiment using one tubular projection section 39a of the heat insulating vessel 39, the number of welding positions is small at the time of the formation of the heat insulating vessel 39, so that the heat insulating vessel 39 can be manufactured cheaply.

In the heat accumulator having one tubular projection section 39a of the heat insulating vessel 39, by using the porous pipe 300, the engine cooling water can be circulated in the heat insulating vessel 39, and the heat accumulating medium 9 in the heat insulating vessel 39 can exchange heat with the engine cooling water.

Although $Ba(OH)_2 \cdot 8H_2O$ is used as a heat accumulating medium 9 in the foregoing embodiments, $Mg(NO_3)_2 \cdot 6H_2O$ which has a melting point of 89° C. and a latent heat of fusion of 38 cal/g or the like can be also used.

The present invention is not limited to implementation in a quick-acting heating device for an automobile, but can also be also applied to a quick-acting heating device used in a house or the like, such as a hot water supplying device.

Although the heat accumulating pipe 5 has a tubular shape, the invention is not limited to that shape, and an oval shape can be also used.

Although the present invention has been fully described in connection with the preferred embodiment thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A heating apparatus comprising:

a heat accumulating medium including a salt hydrate, causing no supercooling, which is capable of reversible change between a liquid phase and a solid phase accompanying absorption and discharge, respectively, of latent heat, said heat accumulating medium, in a non-agitated state, forming refractory crystals at a temperature equal to or larger than a melting point of said heat accumulating medium due to an uneven distribution of water formed when said heat accumulating medium melts;

a heat accumulating vessel, made of a heat conductive material, containing said heat accumulating medium;

only a single agitating member movably disposed in said heat accumulating vessel for agitating substantially all of said heat accumulating medium in said heat accumulating vessel to evenly distribute said water and thereby prevent formation of said refractory crystals in said heat accumulating medium, said agitating member having a size sufficient to agitate said heat accumulating medium;

a heat transfer medium for exchanging heat with said heat accumulating medium in said heat accumulating vessel;

a heat insulating vessel, containing said heat accumulating vessel and said heat transfer medium, for exchanging heat with said heat accumulating vessel, said heat insulating vessel including heat insulating means for insulating external heat from said heat accumulating vessel and said heat transfer medium; and a heat accumulator, having an inlet and an outlet and being connected to said heat insulating vessel, for permitting said heat transfer medium to flow into said heat insulating vessel through said inlet and for permitting said heat transfer medium to flow out of said heat insulating vessel.

2. A heating apparatus according to claim 1, wherein an agitating means includes driving means, disposed external to said heat accumulating vessel, for displacing said heat accumulating vessel.

3. A heating apparatus according to claim 1, further comprising:

a vibration source;

wherein an agitating means includes elastic supporting means for elastically supporting at least one of said heat accumulating vessel and said heat insulating vessel; and at least one of said heat accumulating vessel and said heat insulating vessel is disposed to be vibrated by said vibration source through said elastic supporting means.

4. A heating apparatus according to claim 1, further comprising:

a plurality of additional heat accumulating vessels; and a plurality of additional agitating members;

wherein each of said heat accumulating vessel and said additional heat accumulating vessels is a tubular member having opposing closed ends and contain said agitating member and said plurality of additional agitating members therein.

5. A heating apparatus according to claim 1, wherein:

the heat insulating vessel includes a tubular member having one end receiving said heat transfer medium through said inlet;

the tubular member has a wall having holes disposed therein; and the heat transfer medium flows from said tubular member through said holes into said heat insulating vessel.

6. A heating apparatus according to claim 1, wherein said heat insulating vessel has a single opening through which an interior of said heat insulating vessel communicates with an exterior thereof; and the inlet and outlet are connected to said opening.

7. A heating apparatus according to claim 1, wherein said agitating member is for agitating said heat accumulating medium when said heat accumulating medium is melted.

8. A heating apparatus according to claim 1, further comprising:

a hot water supplying source for supplying hot water serving as the heat transfer medium;

a heat radiator which exchanges heat in said hot water supplied from said heat accumulator with air proximate to said radiator to heat said air;

wherein said inlet, said hot water supplying source, said heat insulating vessel, said heat radiator, and said outlet define a first circuit for permitting said hot water to flow therethrough; and said inlet, said heat insulating vessel, said heat radiator and said outlet define a second circuit for permitting said hot water to flow therethrough.

9. A heating apparatus according to claim 8, wherein:

said hot water is engine cooling water, said hot water supplying source is an automotive engine; and said heat radiator is a heater core for heating a passenger compartment of a vehicle.

10. A heating apparatus according to claim 1, wherein:

said heat accumulating member is a sphere having a diameter approximately half of an inside diameter of said container.

11. A heating apparatus according to claim 1, wherein said heat accumulating medium includes $Ba(CH)_2 \cdot 8H_2O$.

12. A method of exchanging heat with a coolant, said method comprising steps of:

passing said coolant over a container containing a heat accumulating medium capable of transferring latent heat to said coolant when said heat accumulating medium makes a reversible phase change from a liquid phase to a solid phase and capable of receiving latent heat from said coolant when said heat accumulating medium makes a reversible phase change from said solid phase to said liquid phase, said heat accumulating medium, in a non-agitated state, forming refractory crystals at a temperature equal to or larger than a melting point of said heat accumulating medium due to an uneven distribution of water formed when said heat accumulating medium melts;

transferring heat from said heat accumulating medium to said coolant when said coolant is at a temperature lower than that of said heat accumulating medium;

transferring heat from said coolant to said heat accumulating medium when said coolant is at a temperature sufficient to cause said heat accumulating medium to make said phase change from said solid phase to said liquid phase; and during said step of transferring heat from said heat accumulating medium to said coolant, agitating substantially all of said heat accumulating medium using only a single agitating member movable in said container and having a specific size sufficient to evenly distribute said water and thereby prevent formation of said refractory crystals in said heat accumulating medium.

13. The method of claim 12, said agitating step comprising a step of creating a flow of said heat accumulating medium within said container to make a distribution of water in said heat accumulating medium uniform.

14. The method of claim 12, said agitating step comprising a step of creating a flow of said heat accumulating medium within said container to inhibit growth of unmelted refractory crystals in said heat accumulating medium.

15. The method of claim 12, said agitating step comprising a step of moving said container using a vibrational force of a motive power source, thereby agitating said heat accumulating medium.

16. A method of exchanging heat with a coolant according to claim 12, wherein:

said container is tubular; and said agitating member is a sphere having a diameter which is approximately half an inside diameter of said container.

17. A method of exchanging heat with a coolant according to claim 12, wherein:

said container is composed of a plurality of tubular containers, each of said plurality of tubular containers having opposing closed ends and containing said heat accumulating medium therein; and said agitating member is composed of a plurality of agitating members, each of said plurality of agitating members being movably disposed in a corresponding one of said plurality of tubular containers.

18. A method of exchanging heat with a coolant according to claim 12, wherein said heat accumulating medium includes $Ba(OH)_2 \cdot 8H_2O$.

19. A heating apparatus comprising:

a heat accumulating medium including a salt hydrate capable of a reversible change between a liquid phase and a solid phase accompanying absorption and discharge, respectively, of latent heat;

a heat accumulating vessel made of a heat conductive material and containing said heat accumulating medium therein;

an agitating member composed of only one body and movably disposed in said heat accumulating vessel, said agitating member being for agitating substantially all of said heat accumulating medium in said heat accumulating vessel;

a heat insulating vessel containing said heat accumulating vessel therein and having an inlet port and an outlet port; and a heat transfer medium which flows into said heat insulating vessel through said inlet port, flows around said heat accumulating vessel for exchanging heat with said heat accumulating medium, and flows out of said heat insulating vessel through said outlet port.

20. A heating apparatus according to claim 19, wherein said agitating member is a sphere having a size sufficient to agitate said heat accumulating medium and thereby prevent formation of refractory crystals in said heat accumulating medium.

21. A heating apparatus according to claim 20, wherein:

said heat accumulating vessel is tubular; and said sphere has a diameter of about half an inside diameter of said heat accumulating vessel.

22. A heating apparatus according to claim 19, wherein said heat accumulating medium includes $Ba(OH)_2 \cdot 8H_2O$.

* * * * *